(12) United States Patent
Traywick et al.

(10) Patent No.: US 12,526,274 B2
(45) Date of Patent: Jan. 13, 2026

(54) GEOLOCATED PORTABLE AUTHENTICATOR FOR TRANSPARENT AND ENHANCED INFORMATION-SECURITY AUTHENTICATION OF USERS

(71) Applicant: Bank of America Corporation, Charlotte, NC (US)

(72) Inventors: Edward Lee Traywick, Bellbrook, OH (US); Joshua Johnson, Denver, NC (US); Ava Elizabeth Wallace, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 452 days.

(21) Appl. No.: 18/093,124

(22) Filed: Jan. 4, 2023

(65) Prior Publication Data

US 2024/0223550 A1    Jul. 4, 2024

(51) Int. Cl.
*H04L 9/40* (2022.01)

(52) U.S. Cl.
CPC .................. *H04L 63/083* (2013.01)

(58) Field of Classification Search
CPC .... H04L 63/08; H04L 63/083; H04L 63/0838
See application file for complete search history.

(56) References Cited

U.S. PATENT DOCUMENTS

| | | | |
|---|---|---|---|
| 7,444,517 B2 | 10/2008 | Dayan et al. | |
| 7,526,652 B2 | 4/2009 | Ziegler | |
| 8,176,324 B1 | 5/2012 | Krishnamurthy | |
| 8,683,232 B2 | 3/2014 | Yuen et al. | |
| 9,350,714 B2 | 5/2016 | Freeman et al. | |
| 10,547,453 B2 | 1/2020 | Csik et al. | |
| 2009/0044282 A1 | 2/2009 | Govindaraju | |
| 2014/0189808 A1* | 7/2014 | Mahaffey | G06F 21/6245 726/4 |
| 2016/0072797 A1* | 3/2016 | Wilson | H04L 63/107 726/9 |
| 2016/0261411 A1 | 9/2016 | Yau et al. | |

(Continued)

FOREIGN PATENT DOCUMENTS

EP        2143028 B1    11/2013

*Primary Examiner* — Amie C. Lin
*Assistant Examiner* — Ayub A Maye
(74) *Attorney, Agent, or Firm* — Banner & Witcoff, Ltd.

(57) ABSTRACT

An information-security process for enhanced user authentication is disclosed. In addition to username, password, dual-factor and/or other security, an authenticator is worn or carried on the person of a user. The authenticator can be detected to be within local range of a workstation and/or geolocated. If the authenticator corresponds to the user and the user's security information, and if the authenticator is in the correct range or location, access to the workstation can be authorized. Otherwise, it is rejected. Access can also be terminated automatically if the authenticator leaves the security range around the workstation or if a different user's authenticator enters the security range. Positional or range information can be determined by NFC, Bluetooth, BLE, RFID, Wi-Fi, triangulation, time-of-flight protocols/components distributed throughout work area(s) and/or embedded in workstation(s). Cooperative components working therewith are in the authenticator.

20 Claims, 12 Drawing Sheets

(56) References Cited

U.S. PATENT DOCUMENTS

| | | | |
|---|---|---|---|
| 2017/0230368 A1* | 8/2017 | Khan | H04L 63/101 |
| 2019/0036940 A1* | 1/2019 | Balakrishnan | H04L 63/12 |
| 2020/0112554 A1* | 4/2020 | Murthy | H04L 63/08 |
| 2020/0294401 A1* | 9/2020 | Kerecsen | G08G 1/205 |
| 2022/0086141 A1* | 3/2022 | Mossler | G06F 21/35 |
| 2023/0410172 A1* | 12/2023 | Goetz | G06V 30/41 |
| 2024/0007293 A1* | 1/2024 | Farhady Ghalaty | G06Q 10/1095 |

* cited by examiner

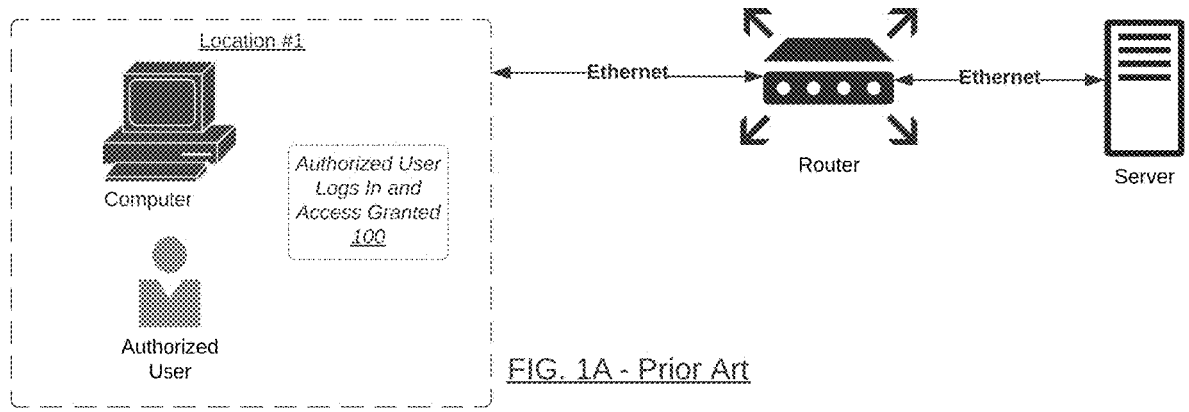
FIG. 1A - Prior Art
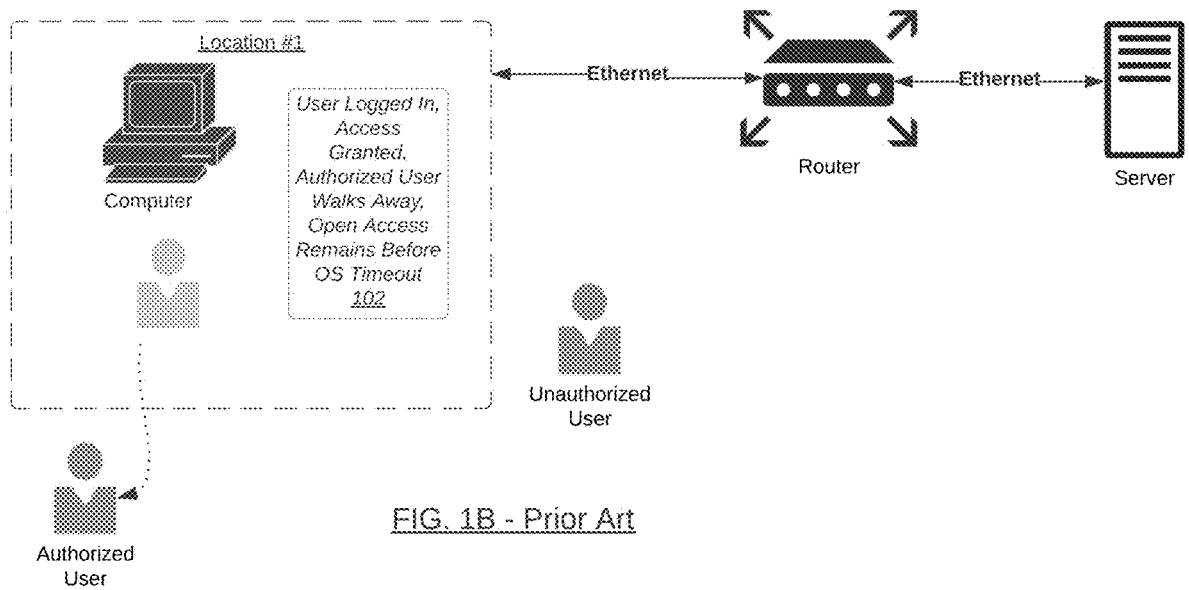
FIG. 1B - Prior Art
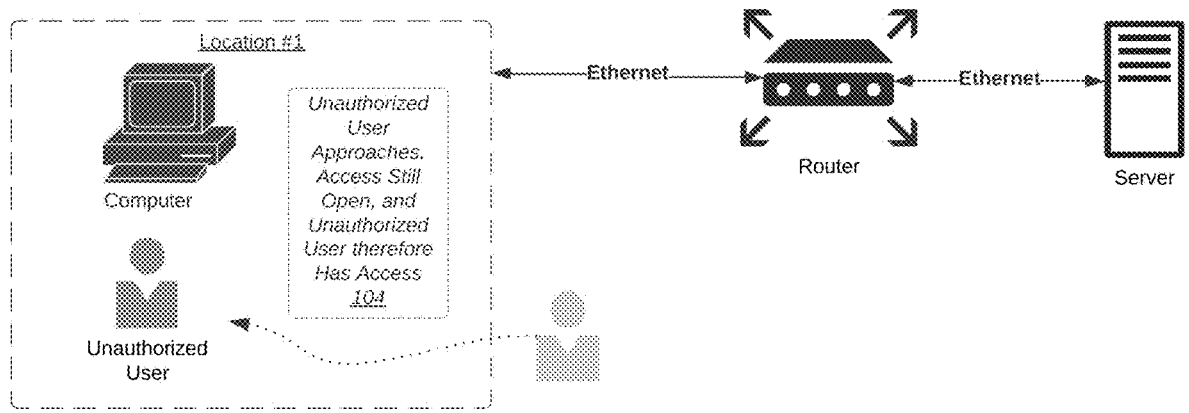
FIG. 1C - Prior Art

GEOLOCATED PORTABLE AUTHENTICATOR FOR TRANSPARENT AND ENHANCED INFORMATION-SECURITY AUTHENTICATION OF USERS

TECHNICAL FIELD OF DISCLOSURE

The present disclosure relates to information security and, more particularly, systems, methods, and apparatus for the prevention of unauthorized access to resources of a system or information system, including the manner of identifying and verifying the entity, process, or mechanism requesting access to the resource.

BACKGROUND

Once physically inside a company's facility (e.g., after having passed by a security desk or entering through a security turnstile), the only barrier to users accessing computers or resources is often limited to a simple login and password combination that is entered into a login screen provided by a computer's operating system. At most, a one-time dual factor challenge may be issued by the computer or security system that may, for example, prompt confirmation on a secondary device (e.g., an app on smart phone) of the user request to the computer or resource. And the secondary authentication can be completed by the user confirming the login attempt and passing a facial ID scan, fingerprint scan, or entry of a separate secondary device passcode or the like. After entering a login and password, and performing the dual authentication, the user then has access to the computer or resources as shown in FIG. 1A. In some instances, the computer session may remain open indefinitely. In other implementations, the operating system may lock the computer after a period of inactivity (e.g., 15 minutes with no user activity).

As shown in FIG. 1B, this presents a security problem if (a) the authorized user walks away after having logged into the computer (and optionally also completing a dual factor challenge), and (b) the operating system does not promptly lock the computer due to inactivity (e.g., the computer has only been inactive for 5 minutes and the lock timeout is 15 minutes).

As illustrated in FIG. 1C, an unauthorized user can then approach the unlocked computer while access is still open and before the operating system has a chance to timeout and lock the machine. Thus, in this scenario, an unauthorized user can gain access to a computer and computer resources despite an operating system securing a computer with a login/password screen, having secondary security in the form of a dual-factor authentication with a separate device, and the operating system automatically locking the computer after a relatively short period of inactivity.

One prior art approach towards solving this problem is to decrease the period of time of inactivity before an operating system will lock or secure the computer. For example, the operating system could lock the computer after 1 minute or 5 minutes of inactivity as opposed to longer 15 minute or the like intervals. But short of intervals waste user time by requiring very frequent and recurring logins and/or dual factor challenges. It is frustrating to the users, is distracting, and decreases user productivity. The user essentially spends most of the day logging into the machine and then logging back into the same machine.

Hence there is a long felt and unsatisfied need in the field of information security to provide improved security for user access to machines and resources. The information security should be automatic, minimalistic, and transparent (or operating in the background) such that the security does not frustrate users, distract them, or interfere with their productivity. The information security must be fast such as being performed real-time, substantially continuously, or at fast periodic intervals that are more frequent than traditional operating-system lock timeouts. The improved security should be automatic such that the user is not required to do anything with the authenticator device. The improved security should also be wireless such that it can be simply carried by the user or worn on the user as a wearable device. The security should also enable location tracking of authorized and unauthorized for information security purposes to control access to computers or resources, as well as to control access to locations or rooms where the user is allowed or not allowed to enter, and for emergency safety reasons (e.g., making sure that all employees and their locations are known in the event of a fire or other emergency situation).

SUMMARY

In accordance with one or more arrangements of the non-limiting sample disclosures contained herein, solutions are provided to address one or more of the shortcomings in the field of information security by, inter alia: (a) geographically distributing a plurality of location detection devices that act as wireless transmitters and/or receivers that work in conjunction with wearable and/or portable authenticators-worn on or carried by users and corresponding location and proximity security hardware and functionality implemented in workstations, (b) geolocating user authenticators and detecting workstation proximities based on analysis of signals transmitted and/or received by beacons/gateways, the authenticators, and the workstations, (c) real-time, near real-time, continuous, substantially continuous, and/or periodic short-interval secondary, tertiary, or supplemental enhanced authentication of users at precise locations within the facility, (d) generating alerts for unauthorized users attempting to use workstations or being located in restricted areas, (e) tracking users locations through a company's premises and their proximity to certain areas, rooms, or resources, and (f) using signal triangulation, time of flight analysis, Bluetooth, Bluetooth Low Energy, near field communications (NFC), or similar wireless technologies and protocols to determine proximity, locations, ranges, relative positioning, vector bearings, signal magnitudes and intensities, and the like.

The following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an information-security process for authenticating a user can be implemented by receiving, by a workstation, a username and password for the user; transmitting, by the workstation to an information-security server, the username and the password; issuing, by the information-security server to the user, a dual-factor challenge; receiving, by the information-security server from the user, the dual-factor challenge; communicating, to the information-security server, whether an authenticator for the user is within a security range to the workstation; receiving, by the workstation from the authenticator, identification information for the authenticator of the user; transmitting, by the workstation to the information-security server, the identification information for the authenticator; granting, by the information-security server, access to the workstation if: (a) the username and the password were entered correctly, (b) the dual-factor challenge was successful, (c) the authenticator is within the security range of the workstation, and (d) the identification information for the authenticator corresponds to the username and the password; or otherwise rejecting, by the information-security server, said access to the workstation if: (i) the username and the password were entered incorrectly, (ii) the dual-factor challenge was unsuccessful, (iii) the authenticator is outside the security range of the workstation, or (iv) the identification information for the authenticator does not correspond to the username and the password; and terminating, by the information-security server, said access to the workstation if the authenticator exits the security range around the workstation.

In some arrangements, the determination of whether the authenticator is within the security range is updated in real-time. Or the determination of whether the authenticator is within the security range or close proximity or proximate range is updated at least one periodic interval less than an inactivity timeout for the workstation. For example, if the timeout period for computer inactivity is set to be 5 minutes, the periodic determination intervals could be every 30 seconds, every minute, or other period shorter than the timeout threshold. Another option is for the determination of whether the authenticator is within the security range is updated continuously or continuously at intervals.

In some arrangements, a workstation can determine whether the authenticator is within the security range or proximate range. Additionally, or alternatively, one or more location-detection devices can determine whether the authenticator is within the security range.

In some arrangements, local detection of authenticators can be performed by the workstation using a local-communication protocol such as a near-field-communication (NFC) or a radio frequency identification (RFID) protocol.

In some arrangements, local detection of authenticators can be performed using triangulation or a time-of-flight process using Bluetooth, Bluetooth Low Energy, Wi-Fi, RFID, or other geolocating electrical components.

In some arrangements, at least one geolocation device can determine whether the authenticator is within a security range or in sufficiently close proximity. Alternatively, a plurality of geolocation devices can be used to determine whether the authenticator is within the security range.

In some arrangements, a position of the authenticator can be determined by a plurality of time-of-flight measurements made between a plurality of geolocation devices and the authenticator.

In some arrangements, an information-security process for authenticating a user can be implemented by receiving, by a workstation, a username and password for the user; detecting, by the workstation using an NFC or RFID protocol, whether an authenticator is within a security range of the workstation; rejecting, by the workstation, access to the workstation if the authenticator is not within said range of the workstation; scanning, by the workstation from the authenticator, security information for the user; transmitting, by the workstation to an information-security server, the username, the password, and the security information; receiving, by the workstation from the information-security server, an approval for said access the workstation if: (a) the username and the password were entered correctly, and (b) the security information corresponds to the user; and receiving, by the workstation from the information-security server, a denial for said access to the workstation if: (i) the username and the password were entered incorrectly, or (ii) the security information does not correspond to the user.

In some arrangements, a workstation can terminate access thereto if the authenticator ceases to be within the security range of the workstation. The termination can be performed in real-time and can be immediate upon detection. Alternatively, the detection and termination could be performed at a security interval.

In some arrangements, a workstation can terminate access thereto if a second authenticator not corresponding to the user enters the security range or zone of the workstation.

In some arrangements, a workstation can generate a security alert if a second authenticator is detected to be within the security range or zone of the workstation and can transmit the alert to an information-security server.

In some arrangements, an information-security process for authenticating a user can be implemented by receiving, by a workstation, a username and password for the user; detecting, by the workstation using a local communication protocol (e.g., NFC, RFID, etc.), whether an authenticator is within a security range or zone of the workstation; rejecting, by the workstation, access to the workstation if the authenticator is not within said range of the workstation; scanning, by the workstation from the authenticator, security information for the user; transmitting, by the workstation to an information-security server, the username, the password, and the security information; receiving, by the workstation from the information-security server, an approval for said access the workstation if: (a) the username and the password were entered correctly, and (b) the security information corresponds to the user; and receiving, by the workstation from the information-security server, a denial for said access to the workstation if: (i) the username and the password were entered incorrectly, or (ii) the security information does not correspond to the user; geolocating, by a plurality of location-detection devices using a triangulation or time-of-flight method, a position of the user; transmitting, by one or more of said plurality of location-detection devices to the information-security server, the position of the user; tracking, by the information-security server, the position of the user; detecting, by the workstation, if a second authenticator not corresponding to the user enters said range of the workstation; and terminating, by the workstation in real-time, said access to the workstation if the authenticator ceases to be within said range of the workstation or if the second authenticator is detected.

In some arrangements, one or more various steps of processes disclosed herein can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 1A, 1i, and 1C depict progressive stages of the security vulnerability that is present in various prior art systems.

DETAILED DESCRIPTION

Figure 2A:
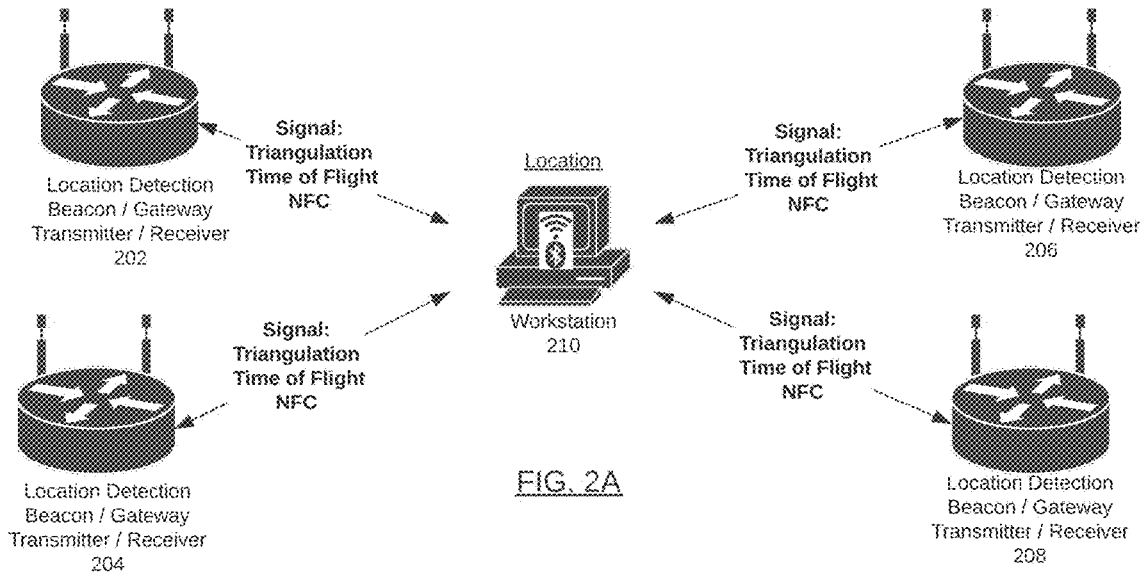
FIGS. 2A and 2B illustrate components of a portable authentication system wherein the workstation and the user's authenticator have authentication capabilities in accordance with one or more information-security aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

Similarly, references to beacons, gateways, and/or transmitters/receivers that may or may not have initial known locations or may have later-calculated locations are also used interchangeably in this specification and are not considered limiting or exclusive to any particular type(s) of electrical device(s), component(s), wireless protocol(s), or the like. Again, references to the foregoing are to be interpreted broadly as understood by persons of ordinary skill in the art. Other specific or general components or details of the foregoing are not depicted in the interest of brevity and would be understood readily by a skilled artisans.

As used throughout this disclosure, software, computer-executable instructions, data, modules, processes, routines, or the like can include one or more: active-learning, algorithms, alarms, alerts, applications, application program interfaces (APIs), artificial intelligence, approvals, attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning, middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs) etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol.

As referenced throughout this disclosure, various protocols and methods can be utilized to determine locations and/or relative positional relationships to system components, movements of components, or movements or detections of users potentially having wearable or portable authenticators. Samples of such protocols and methods can consist of triangulation between signals transmitted from a plurality of locations and/or devices, vectors of direction and magnitude determined based on signal bearings and signal strength (wherein there is an inverse relationship between signal intensity and distance of the signal, and such intensity falloff can be empirically determined), time of flight analysis between a plurality of initiator devices and responder devices, as well as other such geolocating or positional/distance mechanisms. The foregoing may be accomplished through the use of Bluetooth components, Bluetooth Low Energy components, Near Field Communications (NFC) devices, Wi-Fi components, radio frequency modulated transmissions, signal propagation measurements, or the like that may be suitable for indoor locations within a company's premises.

By way of background, FIGS. 1A, 1B, and 1C illustrate sample security vulnerabilities that are potentially present in locations involving multiple computers and multiple users. As shown in FIG. 1A, a user can approach a computer and log into the operating system. For example, a user may enter a username and password for a given network domain. Additionally, a dual-factor authentication may be completed as an extra level of security. After successful login (and dual-factor authentication if desired), the user has access 100 to the machine. The access will remain available, and the user will continue to be able to use the computer until the user logs out of the machine or, if enabled, an inactivity timeout occurs whereby the operating system automatically locks the machine, either of which will require the user to log back into the machine.

The problem arises at 102, as shown in FIG. 1B, wherein the authorized user walks away from the computer after having already logging into the machine and performing the dual-factor authentication (if required).

If the authorized user walks away and does not lock the computer or otherwise logout, and if the inactivity timeout on the computer is not triggered before an unauthorized user is able to approach the machine and access it, the unauthorized user will have the same access and access rights 104 as the authorized user as shown in FIG. 1C. Stated differently, the unauthorized user is able to continue the login session just as if the authorized user never left the machine. The problem is that the computer does not recognize the difference between the authorized user and the unauthorized user because there was no intervening event to lock the session or machine, log the user out of the session, or detect that the authorized user has left the machine and a different user is now trying to access it.

Figure 2B:
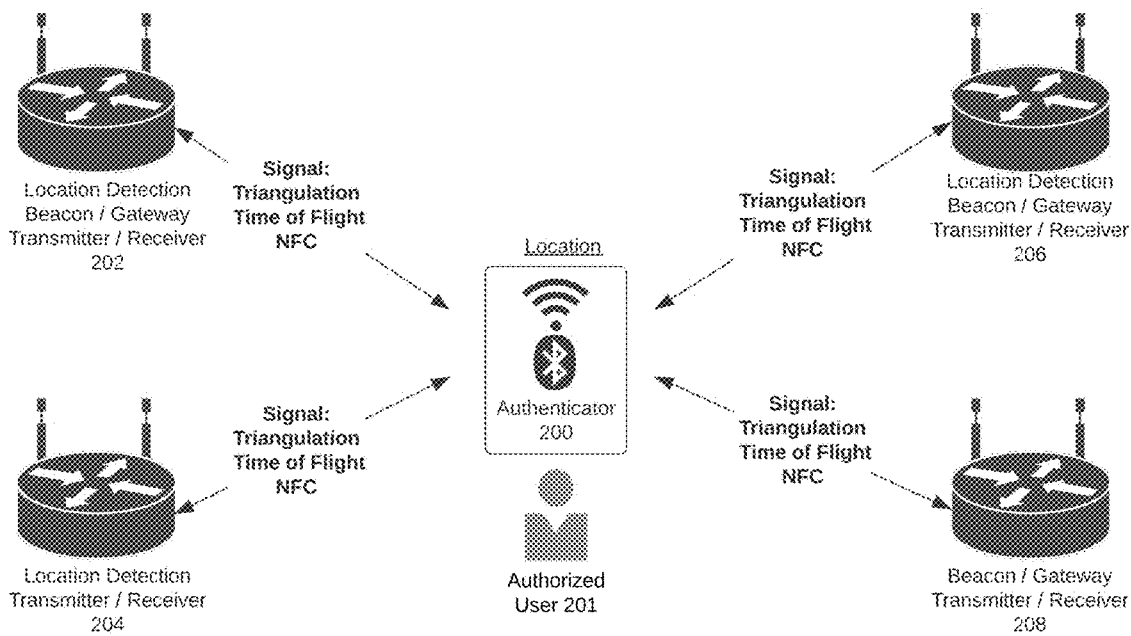

By way of non-limiting disclosure, FIGS. 2A and 2B illustrate components of a portable authentication system wherein the workstation and the user's authenticator have authentication capabilities in accordance with one or more information-security aspects of this disclosure. In FIG. 2A, various location-detection devices (e.g., beacons/gateways, transmitters, receivers or the like) 202, 204, 206, 208 can be distributed over the physical area to be secured. Whether such a device is transmitting, broadcasting, receiving, etc. depends on the particular implementation preferred by the implementing artisan. It does not matter whether the system is setup such that the devices are performing one function, the other function, or a combination of the functions. The devices 202, 204, 206, 208 may be at known physical locations and positions and/or the information-security system may be able to detect and/or geolocate various system devices, components, workstations, authenticators, etc. and/or may be self-aware/self-able to determine their position relative to the other devices, system components, workstations, or authenticators. This can be performed by any individual or combination of signal processing approaches of triangulation, time of flight, etc. and can be accomplished with Bluetooth components, Bluetooth Low Energy components, NFC devices, RFID, Wi-Fi components, radio frequency modulated transmissions, signal propagation measurements, or the like that may be suitable for indoor locations within physical premises to be protected.

Each workstation 210 within the premises preferably has authenticator capabilities, which correspond to the functionality of portable or wearable authenticator 200. This enables the beacons/gateways (or the like) 202, 204, 206, 208 (whose locations are either known or determined by the system) to locate and keep track of each workstation and its relative physical location if desired. It also allows the workstation 210 to detect, independently if desired, the presence or absence of an authenticator 200 within the security range around the workstation. This can be accomplished by setting or designating a fixed range or zone around the machine and/or using inherent range limitations for wireless communication protocols and/or technologies such as, for example, the inherent range limitations for NFC or RFID communications.

Similarly, as shown in FIG. 2B, a user will have on their person an authenticator 200 that will be able to be detected and geolocated by devices 202, 204, 206, 208. The authenticator 200 will be able to not only work in conjunction with the beacons/gateways, but will also be able to communicate with a workstation 210. Accordingly, when an authorized user 201 approaches a workstation 210, the workstation will detect the authorized user, and a plurality of the beacons/gateways (or other) 202, 204, 206, 208 (whose relative locations are known or can be determined if desired) will similarly recognize that the authorized user is sufficiently proximity to the workstation for security purposes. This may be, for example, a radius or distance of about 12-60+ inches or fractions thereof from the workstation to the outer area of the zone around the workstation to be protected. A skilled artisan will recognize that an appropriate area can be selected or designated depending on the topology of the work area, the number of machines in the area, the number of employees, the relative closeness or remoteness of machines from one another, whether machines are in an open area, whether machines are located only in offices, etc.

Figure 2C:
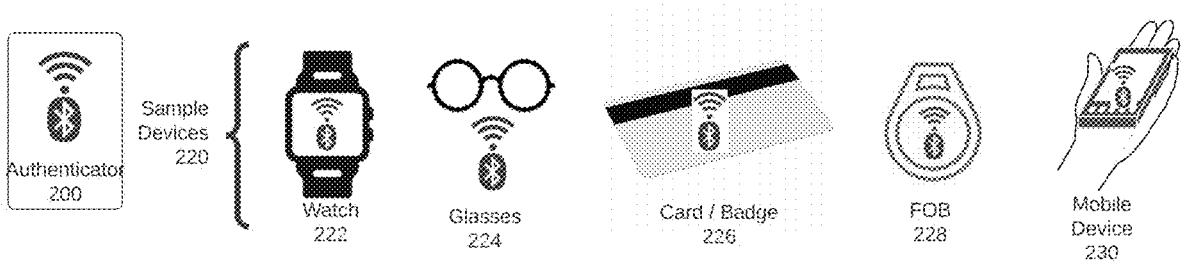
FIG. 2C depicts sample portable or wearable authenticators that can be utilized by users in accordance with one or more information-security aspects of this disclosure.

By way of non-exhaustive and non-limiting examples, FIG. 2C shows sample portable or wearable authenticators 200 that can be utilized by users in accordance with one or more information-security aspects of this disclosure. These include smart watches 222, smart glasses 224, cards or badges (NFC, RFID, or otherwise) 226, FOBs (NFC, RFID, or otherwise) 228, mobile devices 230, tags (not shown) or any other device having the appropriate Bluetooth components, Bluetooth Low Energy components, NFC components, Wi-Fi components, RFID components, signal propagation and/or processing capabilities, or the like.

Figure 3:
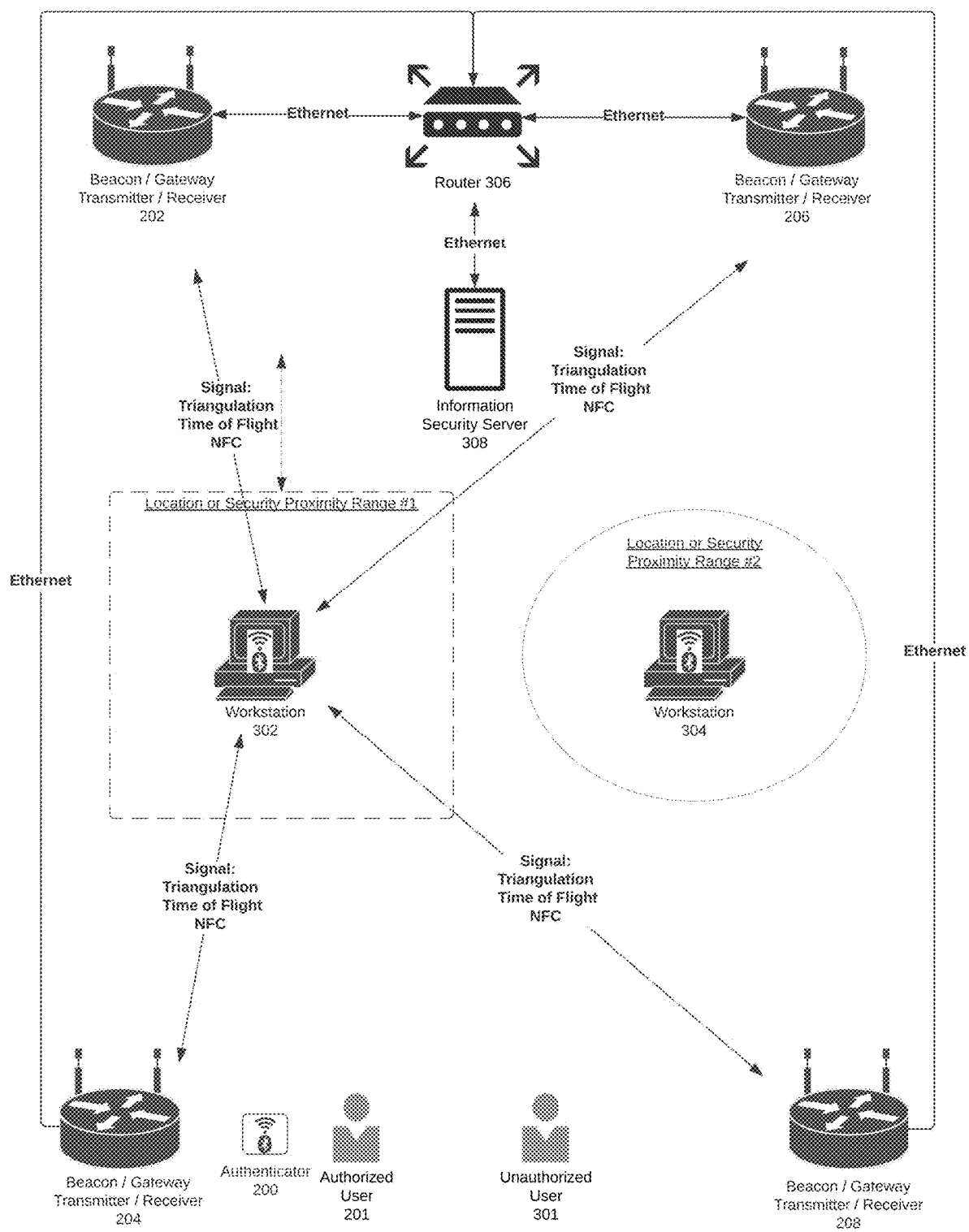
FIG. 3 is a sample architectural diagram showing system components and sample signal paths geolocating workstations secured in accordance with one or more information-security aspects of this disclosure.

By way of non-limiting disclosure, FIG. 3 is a sample architectural diagram showing system components and sample signal paths geolocating workstations secured in accordance with one or more information-security aspects of this disclosure. Various beacons/gateways 202, 204, 206, 208 are networked together through a router 306 and are in communication with an information security server 308. Workstations 302, 304, etc. are also similarly networked to the router 306 and information security server 308, etc. (not shown). Collectively, a plurality of the foregoing can work together to geolocate and keep track of workstations 302, 304 and can geolocate them by using the above-referenced signal methods and wireless technology. User logins and dual-factor authentications can be monitored and/or controlled by information security server 308, which can also keep track of and/or control the authenticator supplemental security authentication process when an authenticator 200 comes into proximity of a workstation 302 and the authorized user 201 attempts to use that workstation 302. This can be differentiated from the situation where an unauthorized user 301 approaches the same machine and therefore will not have access to it. Locations, security ranges, proximate areas, etc. can be of any desired local distance and can be circular in range, directional, or in a geometric shape (e.g., a square, a circle, etc.) as desired.

Figure 4:
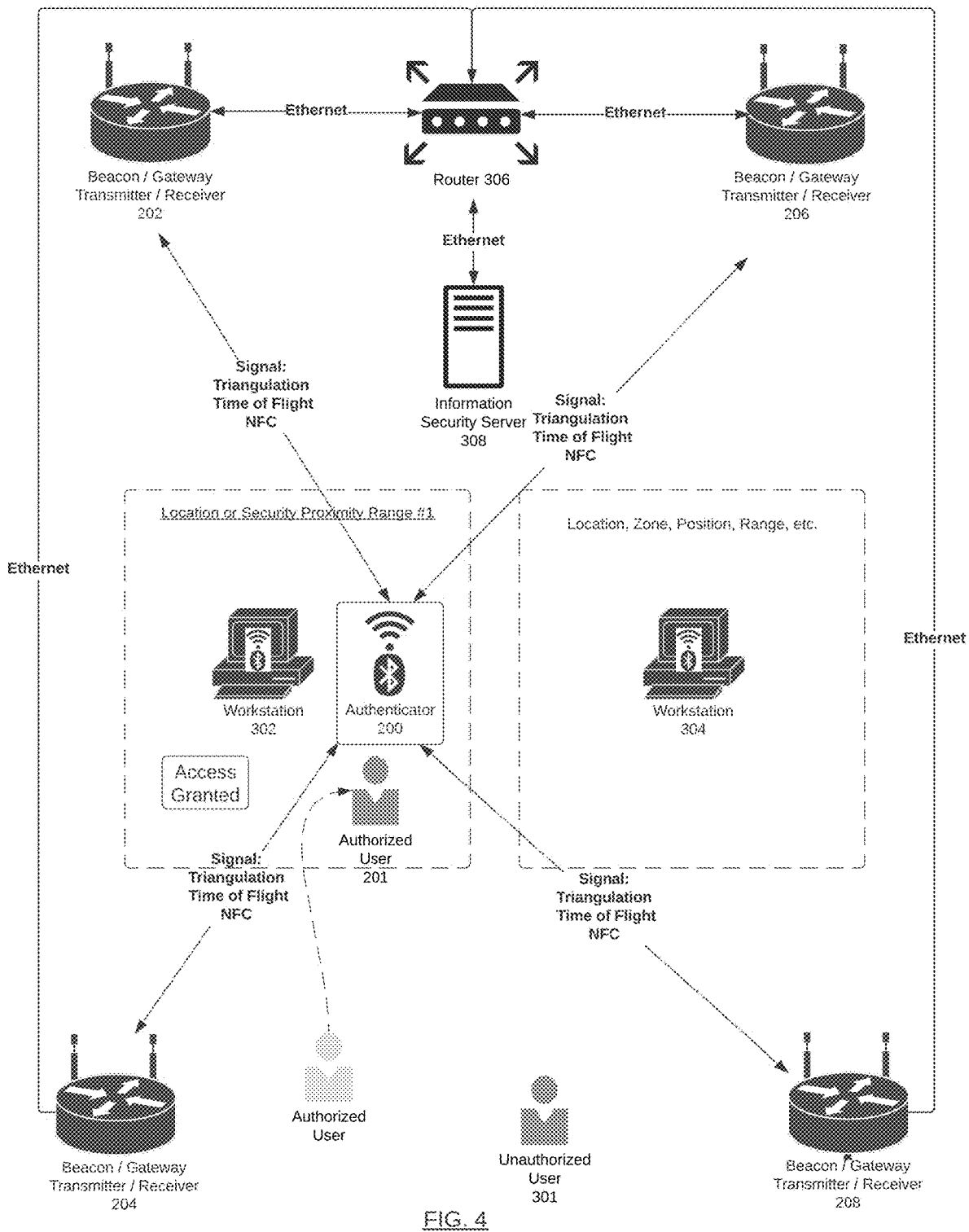
FIG. 4 is another sample architectural diagram showing system components and sample signal paths geolocating an authorized user with a portable or wearable authenticator in accordance with one or more information-security aspects of this disclosure.

By way of non-limiting disclosure, FIG. 4 is another sample architectural diagram showing system components and sample signal paths geolocating an authorized user with a portable or wearable authenticator 200 in accordance with one or more information-security aspects of this disclosure. The authorized user 201 starts off at a location out of range of workstation 302. The user 201 walks up to workstation 302 and, when in proximity to the computer, the user's authenticator 200 is detected. One or more of beacons/gateways 202, 204, 206, 208 may also geolocate the authenticator 200 as being in close proximity to workstation 302. Geolocation and detection of the authenticator 200 in proximity to workstation 302 is communicated from the beacons/gateways, the workstation, or both. Either before, during, or after a traditional login by the user to the operating system on the workstation (or an application running thereon), and either before, during, or after a dual-factor authentication (if desired), the supplemental authentication by the information-security server can be performed to confirm that the authorized user 201 with the authorized user's credentials is in fact in proximity to the workstation 302 and is the person attempting to access that computer.

Importantly, the supplemental authentication by the authenticator 200 and the information-security server need not be a single event. It may be continuous, periodic, or on-demand interrupt driven so that the workstation 302 and/or the beacons/gateways 202, 204, 206, 208 will detect when the geolocation of the authenticator 200 changes such that the user 201 is no longer in close proximity to the workstation. This can result in the machine automatically being locked and does not require the operating system to reach a timeout. Rather, the fact that the authorized user has left the machine can be detected immediately or at least promptly such that an unauthorized user does not have enough time to physically approach and access the unlocked machine. The supplemental authentication thus provides a secondary, tertiary or other level of security protection for physical access to the workstation 302 (e.g., first could be is login/password, second level could be dual-factor authentication (with option face or passcode security), and third level can be authorization confirmed by authenticator 200 being in close proximity or in desired range to the workstation 302 to be accessed). Additional benefits of this information-security approach is that the supplemental protection can be perform in real-time or very quickly, and can also be transparent such that it does not require any form of user action or intervention. The user can be protected without having to do anything other than carry or wear the authenticator on their person. The authenticator may be detected automatically upon entering the range or after a user initiates an access attempt to the workstation.

Figure 5:
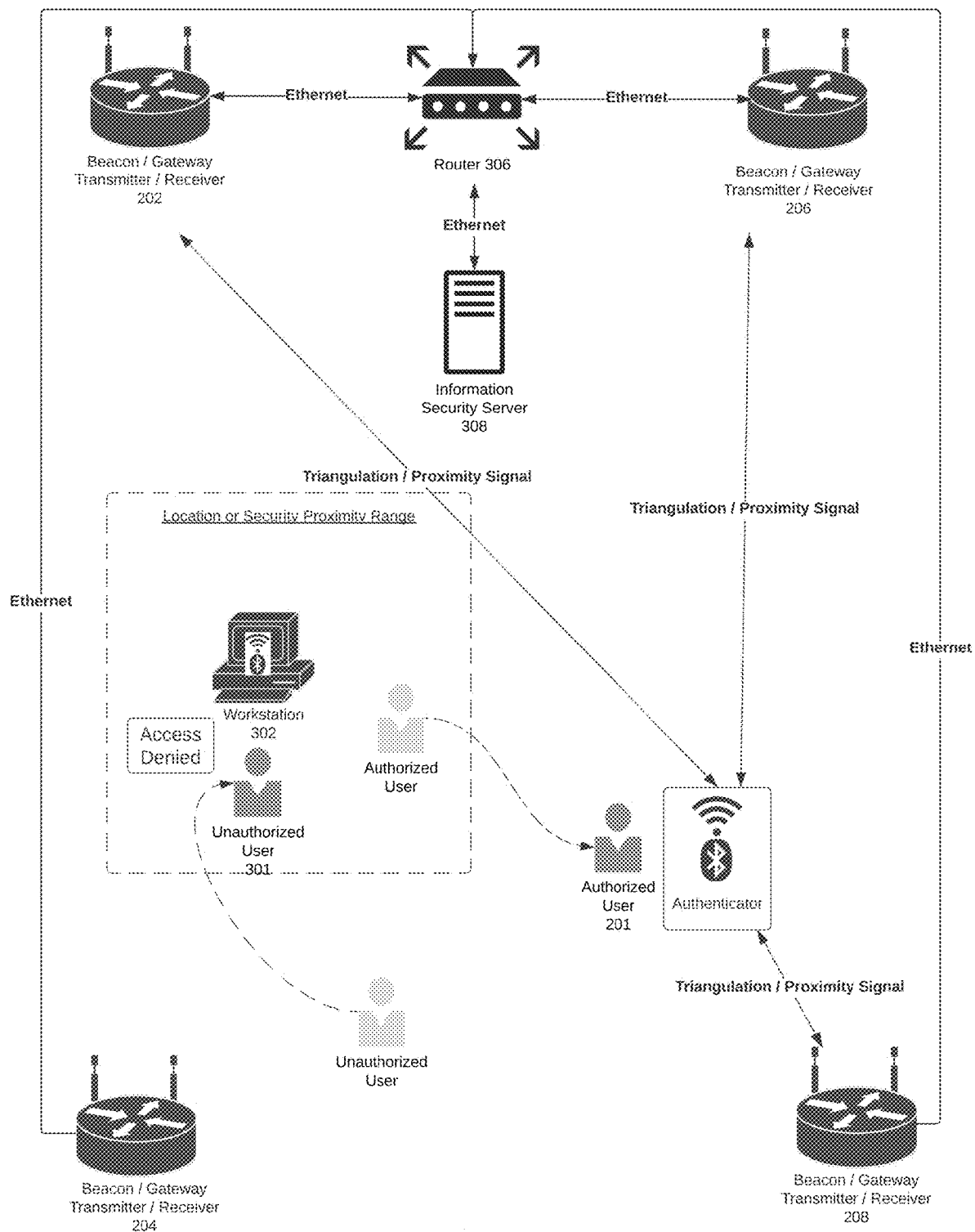
FIG. 5 is further sample architectural diagram showing system components and sample signal paths geolocating the authorized user with a portable or wearable authenticator as the person moves away from the secured workstation and an unauthorized user unsuccessfully attempts to access the secure workstation in accordance with one or more information-security aspects of this disclosure.

By way of non-limiting example, in the architecture diagram of FIG. 5 that shows system components and sample signal paths geolocating the authorized user with a portable or wearable authenticator as the person moves away from the secured workstation. It also shows that an unauthorized user 301 approaches the workstation 302 after the authorized user 201 leaves the machine. This will result in an unsuccessful attempt by the unauthorized user to access the secure workstation. In particular, even though a successful login session would have been performed and a dual-factor authentication could also have been confirmed, the unauthorized user 301 will not be able to access the computer because it would have been automatically locked when the authorized user moved away from the computer. This could be detected by the workstation 302 functionality that works in conjunction with the authenticator 200. It could also be detected by one or more of the beacons/gateways 202, 204, 206, 208 that could recognize via geolocation that the physical location of the authorized user 201 has changed such that the person is no longer at the workstation 302.

Figure 6:
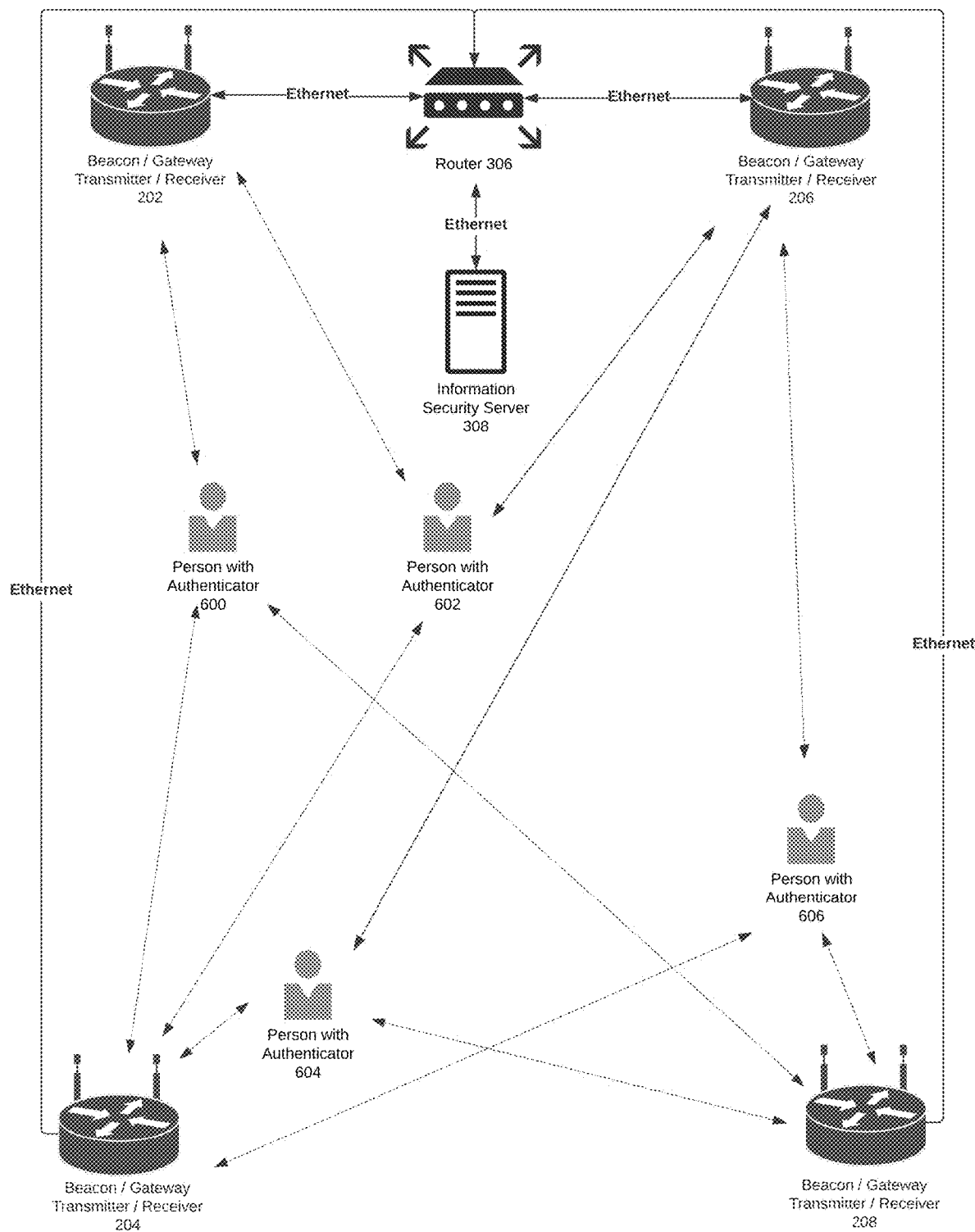
FIG. 6 is a sample signal mapping diagram illustrating how users with portable or wearable authenticators can be geolocated and accounted for in emergency or other applicable situations in accordance with one or more information-security aspects of this disclosure.

FIG. 6 is a sample signal mapping diagram illustrating how users with portable or wearable authenticators 600, 602, 604, 606 can be geolocated and accounted for in emergency or other applicable situations in accordance with one or more information-security aspects of this disclosure. In particular, beacons/gateways 202, 204, 206, 208 can determine each person or employee's location within the physical premises using the previously discussed protocols and wireless functionality. As such, in the event of a fire or other disaster that would require everyone to leave the building, information-security server 308 would be able to determine who is where and whether anyone is still in the building who should have evacuated. It has similar benefits of providing historical tracking of which people were in proximity to which protected machines or locations at various times. Accordingly, if the actions of a person were in question, the history of that person's location can be determined.

Figure 7:
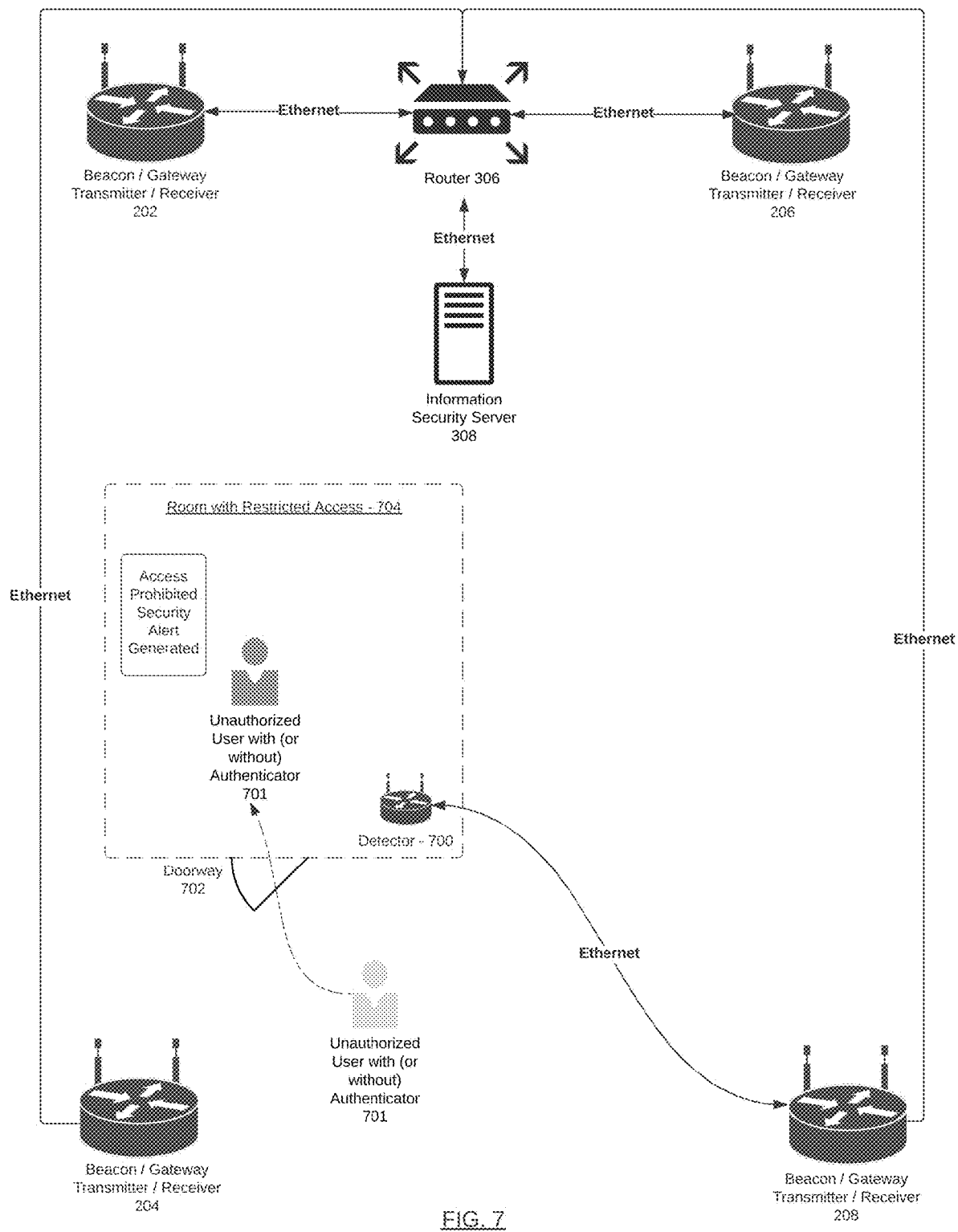
FIG. 7 is a sample architectural diagram showing how unauthorized physical access to a room or area can be detected in accordance with one or more information-security aspects of this disclosure.

By way of non-limiting example, FIG. 7 is a sample architectural diagram showing how unauthorized physical access to a room or area can be detected in accordance with one or more information-security aspects of this disclosure. In particular, a region or room 704 to which access is restricted can be identified geographically and can be protected by geolocation fencing by beacon/gateways 202, 204, 206, 208 and/or can be protected by a detector 700 in the room 704 or located at a door 702 to the room. Accordingly, if a user enters the room, the information-security computer will recognize the event and can trigger alarms or security reporting if desired, thereby promptly notifying security personnel.

Figure 8:
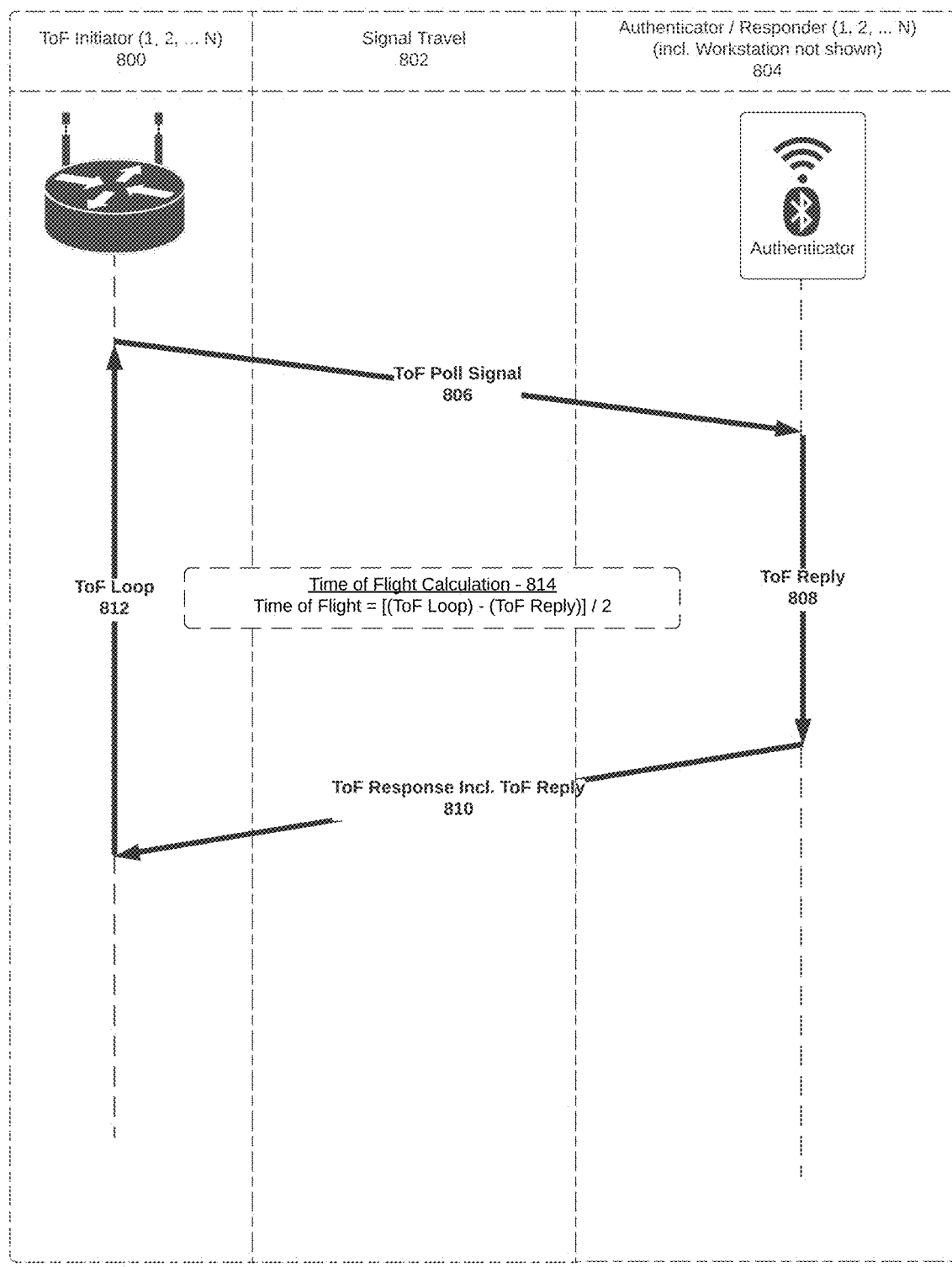
FIG. 8 is a sample time of flight calculation method for determining position relative to one or more system components in accordance with one or more information-security aspects of this disclosure.

FIG. 8 is a sample time of flight calculation method for determining position relative to one or more system components in accordance with one or more information-security aspects of this disclosure. An initiator device 800, such as one or more beacons/gateways 202, 204, 206, 208 can initiate a time of flight (ToF) poll signal 806 at a signal travel path that is received by an authenticator, workstation, or other responder device 804. A ToF reply 808 is then generated and a response 810 is provided back to the initiator 800 such that the ToF loop 812 is completed. The position of the authenticator/responder 804 with respect to the initiator device 800 can be determined based on the time of flight of the signals. In particular, the time of flight 814 would equal the ToF Reply subtracted from the ToF Loop, and the subtracted result then being divided by 2. This same process can be repeated for other beacons/gateways 202, 204, 206, 208 such that the information-security server 308 is able to utilize the combination of times of flight from the beacons/gateways to geolocate the authenticator or responder. Using this methodology, the precise position of the user with an authenticator 200 or the precise position of a workstation within a layout can be determined. Multiple and independent time-of-flight calculations can be performed to the same authenticator from a plurality of location-detection devices and/or workstations.

Figure 9:
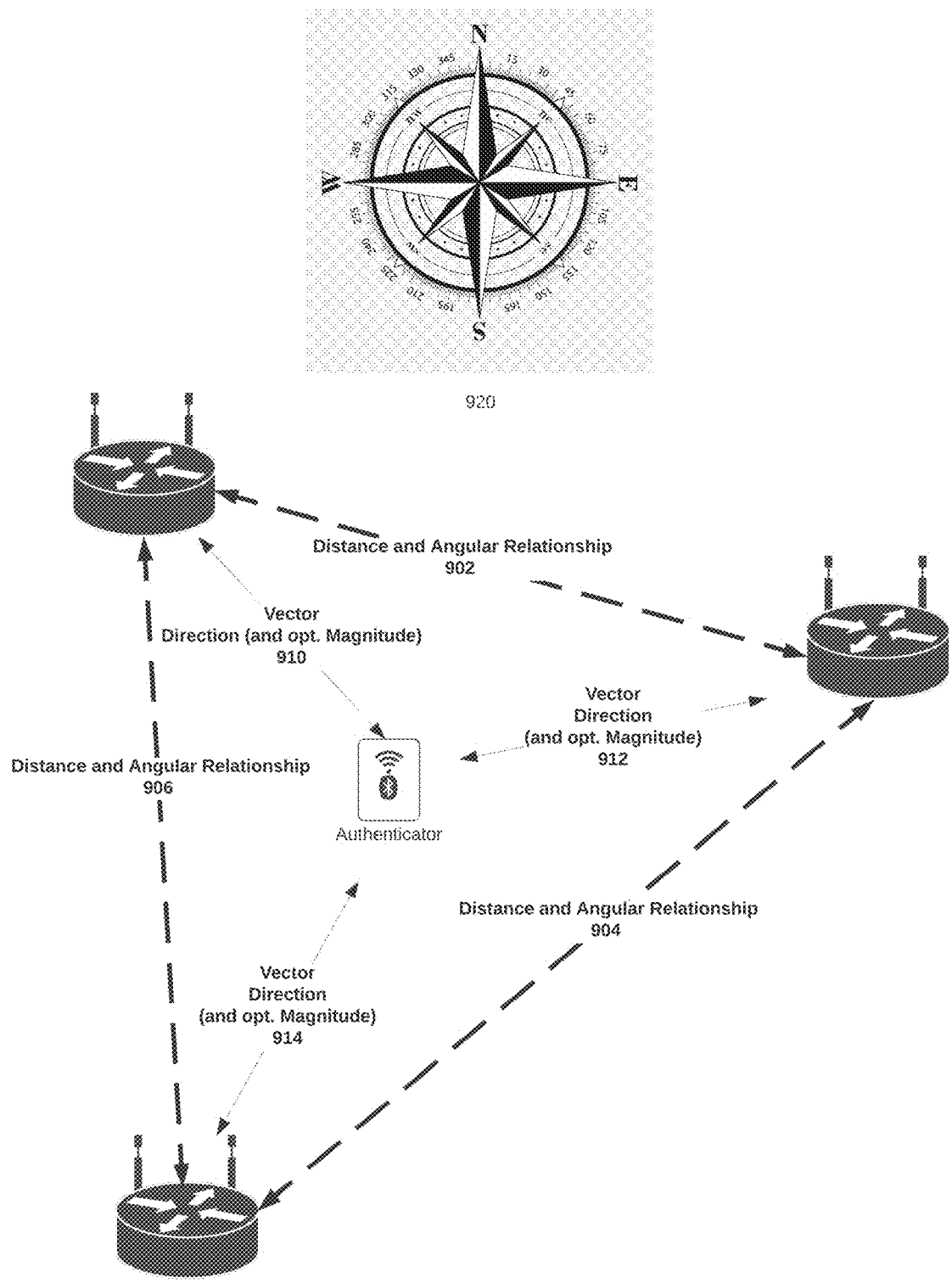
FIG. 9 depict sample triangulation methods for determining positions and positional relationships between system components, workstations, users, etc. in accordance with one or more information-security aspects of this disclosure.

FIG. 9 shows sample triangulation methods for determining positions and positional relationships between system components, workstations, users, etc. in accordance with one or more information-security aspects of this disclosure. In particular, if the relative bearings 910, 912, 914 of one device or authenticator is known or determined from at least two beacons/gateways, the precise location of the device or authenticator can be determined. Stated differently, the precise location will be known by the intersection of the two signals received the beacons/gateways. Another approach could be utilized wherein the location can be determined by a single beacon or gateway based on an empirical determination of the power attenuation of the signal due to the fact that intensity decreases as distance increases. In one or more of the foregoing, additional precision may be obtained if the distance, location, and/or angular relationship between beacons/gateways and/or workstations is known. This is preferable for enhanced accuracy but is not necessary for successful implementation of the inventions. Sample angular bearings can be determined based on a traditional compass rose 920 or by another radial calculation.

Figure 10:
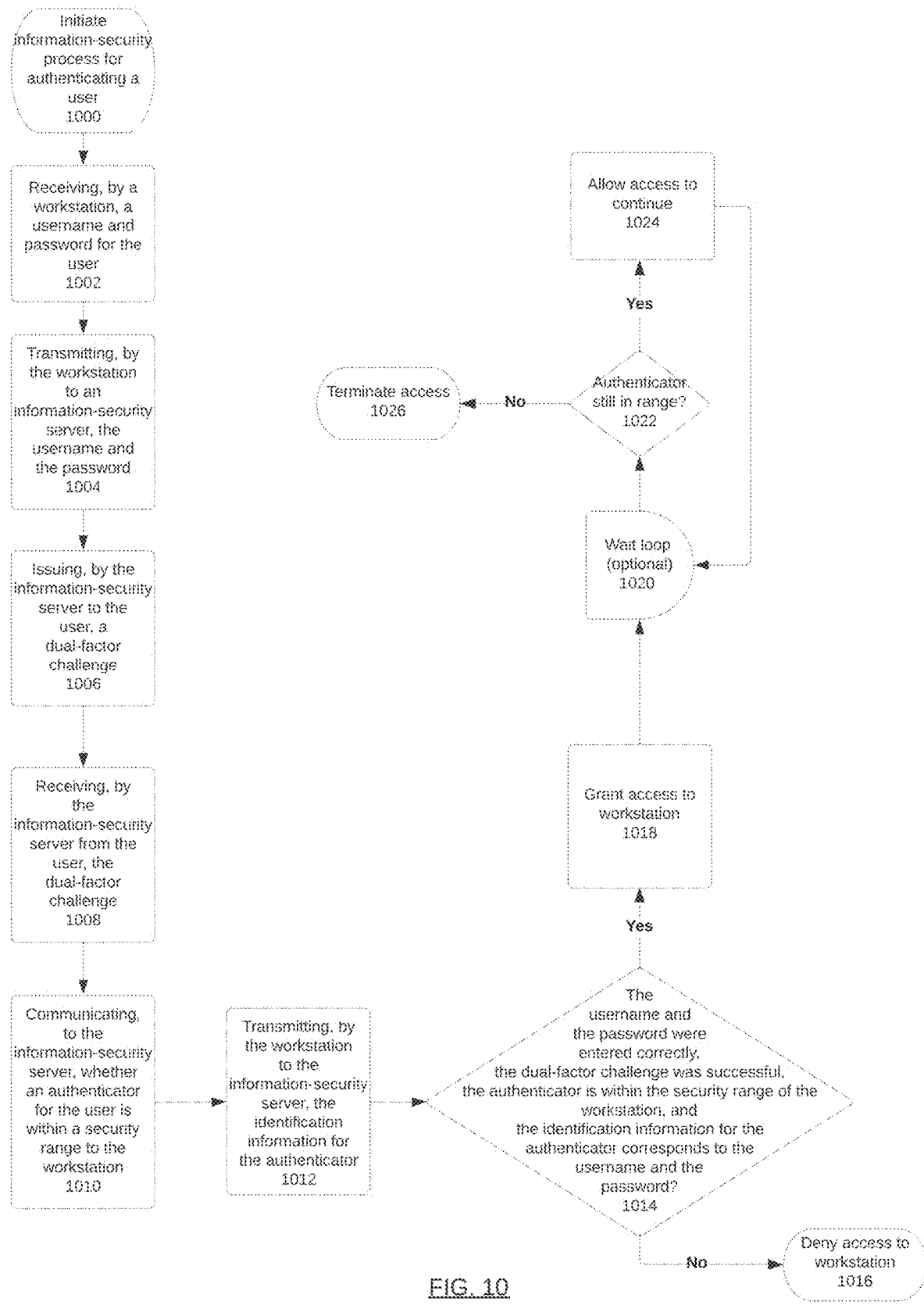
FIGS. 10-12 are sample flow diagrams for implementing one or more of the information-security aspects of this disclosure.

FIG. 10 is a sample flow diagrams for implementing one or more of the information-security aspects of this disclosure. An initiate information-security process for authenticating a user commences at 1000. One or more various steps may then be performed such as, for example: receiving, by a workstation, a username and password for the user in 1002; transmitting, by the workstation to an information-security server, the username and the password in 1004; issuing, by the information-security server to the user, a dual-factor challenge in 1006; receiving, by the information-security server from the user, the dual-factor challenge 1008; and communicating, to the information-security server, whether an authenticator for the user is within a security range to the workstation in 1010; transmitting, by the workstation to the information-security server, the identification information for the authenticator in 1012.

If the username and the password were entered correctly, the dual-factor challenge was successful, the authenticator is within the security range of the workstation, and the identification information for the authenticator corresponds to the username and the password (1014), then access to the workstation may be granted in 1018. Otherwise, access to the workstation may be denied in 1016.

If access is granted, a wait loop may be entered in 1020 to wait for a period of time before checking to see if the authenticator is still located with the zone or range of the workstation. If it is still in range in 1022, continued access may be allowed in 1024 and the wait loop may be continued again. This can be performed on a periodic basis, in real-time, continuously, or on demand. If the authenticator is ever detected to be outside the range or if another authenticator is detected, the access may be terminated automatically in 1026.

Figure 11:
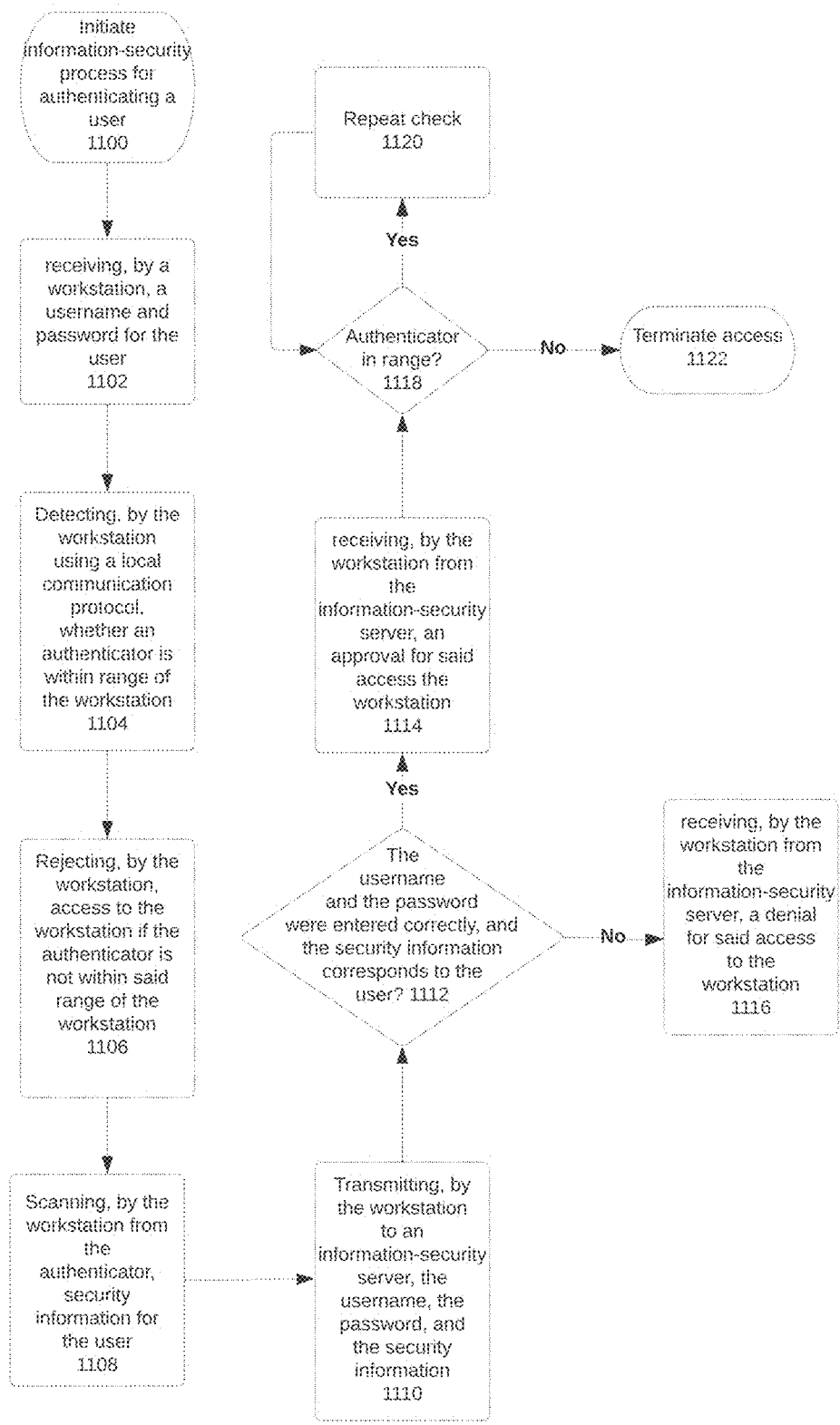
Figure 12:
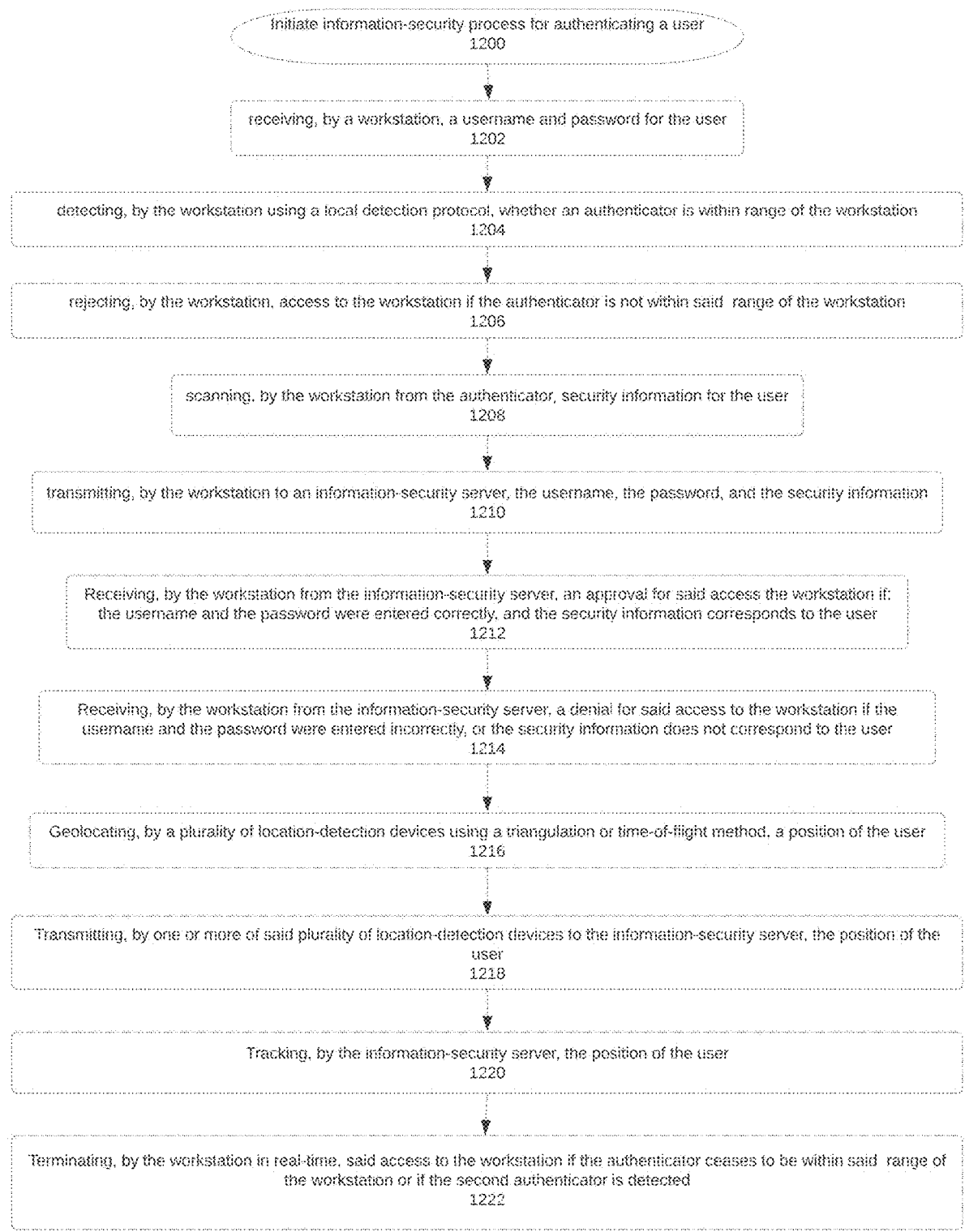

FIG. 11 is another sample flow diagrams for implementing one or more of the information-security aspects of this disclosure. An information-security process for authenticating a user can be initiated in 1100. The process may perform one or more of steps, such as, for example: receiving, by a workstation, a username and password for the user in 1102, detecting, by the workstation using a local communication protocol (e.g., NFC or RFID), whether an authenticator is within range or a security zone of the workstation in 1104; rejecting, by the workstation, access to the workstation if the authenticator is not within said range of the workstation in 1106; scanning, by the workstation from the authenticator, security information for the user in 1108; and transmitting, by the workstation to an information-security server, the username, the password, and the security information in 1110.

If the username and the password were entered correctly, and the security information corresponds to the user in 1112, the information-security server can transmit an approval message to the workstation that is received by it in 1114. Otherwise, the server can transmit a denial message to refuse access to the workstation in 1116.

If access is granted, a check can be performed to verify that the authenticator is in range and that the authenticator corresponds to the credentials of the user. This process and functionality can be repeated at intervals, continuously, on-demand, etc. And it can utilize subsequent communication and verification transmissions and receipts exchanged between the workstation and the server. Also, termination of access may be triggered by an authenticator leaving the secure zone around the workstation or if a different authenticator enters the zone.

FIG. 13 is another example of a flow diagram that can be implemented to utilize one or more information-security aspects of this disclosure. An information-security process for authenticating a user can be initiated in 1200. The process may perform various steps including, for example, one or more of: receiving, by a workstation, a username and password for the user in 1202; detecting, by the workstation using a local detection protocol, whether an authenticator is within range of the workstation in 1204; rejecting, by the workstation, access to the workstation if the authenticator is not within said range of the workstation in 1206; scanning, by the workstation from the authenticator, security information for the user in 1208; transmitting, by the workstation to an information-security server, the username, the password, and the security information in 1210; receiving, by the workstation from the information-security server, an approval for said access the workstation if: the username and the password were entered correctly, and the security information corresponds to the user in 1212; receiving, by the workstation from the information-security server, a denial for said access to the workstation if the username and the password were entered incorrectly, or the security information does not correspond to the user in 1214; geolocating, by a plurality of location-detection devices using a triangulation or time-of-flight method, a position of the user in 1216; transmitting, by one or more of said plurality of location-detection devices to the information-security server, the position of the user in 1218; tracking, by the information-security server, the position of the user in 1220; and terminating, by the workstation in real-time, said access to the workstation if the authenticator ceases to be within said range of the workstation or if the second authenticator is detected in 1222.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. One or more of the software routines or steps may be utilized to implement various aspects of the invention and/or alternative routines or steps may be substituted or incorporated therein. All are within the spirit and scope of the inventions contained herein.

What is claimed is:

1. An information-security process for authenticating a user comprising the steps of:
   receiving, by a workstation, a username and password for the user;
   transmitting, by the workstation to an information-security server, the username and the password;
   issuing, by the information-security server to the user, a dual-factor challenge;
   receiving, by the information-security server from the user, the dual-factor challenge;
   communicating, to the information-security server, whether a first authenticator for the user is within a security range defined as a predetermined physical proximity zone of 12 to 60 inches around the workstation;
   receiving, by the workstation from the first authenticator, identification information for the first authenticator of the user;
   transmitting, by the workstation to the information-security server, the identification information for the first authenticator;
   rejecting, by the information-security server, said access to the workstation when: the username and the password were entered incorrectly, the dual-factor challenge was unsuccessful, the first authenticator is outside the predetermined physical proximity zone security range of the workstation, or the identification information for the first authenticator does not correspond to the username and the password;
   verifying, by the information-security server, that a precise position of the first authenticator corresponds to a location within the predetermined physical proximity zone of the workstation;
   granting, by the information-security server, access to the workstation when: the username and the password are verified as correct, response to the dual-factor challenge is successful, the first authenticator is within the predetermined physical proximity zone, the identification information corresponds to the username and the password, and the precise position aligns with the predetermined physical proximity zone;
   continuously monitoring, by the workstation in real-time, a presence of the first authenticator within the predetermined physical proximity zone at periodic intervals shorter than an inactivity timeout period of the workstation, wherein the periodic intervals are less than 30 seconds;
   detecting, by the workstation using a local-communication protocol, whether a second authenticator not corresponding to the user enters the predetermined physical proximity zone during an active session of the user;
   generating, by the workstation, a security alert when the second authenticator is detected within the predetermined physical proximity zone;
   transmitting, by the workstation to the information-security server, the security alert for logging and potential security action; and
   terminating, by the workstation in real-time, the access to the workstation when: the second authenticator ceases to be within the predetermined physical proximity zone for a security interval of less than 5 seconds, and the second authenticator is detected within the predetermined physical proximity zone.

2. The information-security process of claim 1, wherein the determination of whether the first authenticator is within the predetermined physical proximity zone is updated in real-time or at periodic intervals of less than 30 seconds to ensure continuous proximity verification.

3. The information-security process of claim 1, wherein the determination of whether the first authenticator is within the security range is updated at least one periodic interval less than an inactivity timeout for the workstation.

4. The information-security process of claim 3, wherein the determination of whether the first authenticator is within the security range is updated continuously at said at least one periodic interval.

5. The information-security process of claim 4, wherein the workstation determines whether the first authenticator is within the security range by a near-field-communication (NFC) protocol specifically configured for detecting the authenticator within the predetermined physical proximity zone of 12 to 60 inches.

6. The information-security process of claim 4, wherein the workstation determines whether the first authenticator is within the security range by a radio-frequency-identification (RFID) protocol.

7. The information-security process of claim 4, wherein a plurality of geolocation devices determines whether the first authenticator is within the security range.

8. The information-security process of claim 7, wherein the precise position of the first authenticator is determined by triangulation.

9. The information-security process of claim 7, wherein the precise position of the first authenticator is determined by triangulation by a Bluetooth Low Energy protocol.

10. The information-security process of claim 7, wherein the precise position of the first authenticator is determined by a plurality of time-of-flight measurements made between said plurality of geolocation devices and the first authenticator.

11. The information-security process of claim 8, wherein the precise position of the first authenticator is determined by a plurality of time-of-flight measurements made between said plurality of geolocation devices and the first authenticator using a Bluetooth Low Energy protocol.

12. An information-security process for authenticating a user comprising the steps of:
receiving, by a workstation, a username and password for the user;
issuing, by an information-security server to the user, a dual-factor challenge;
receiving, by the information-security server from the user, the dual-factor challenge;
detecting, by the workstation using a local-communication protocol, whether a first authenticator is within a proximate range defined as a predetermined physical proximity zone of 12 to 60 inches around the workstation;
rejecting, by the workstation, access to the workstation when the first authenticator is not within said predetermined physical proximity zone scanning, by the workstation from the first authenticator, security information for the user;
transmitting, by the workstation to the information-security server, the username, the password, and the security information;
receiving, by the workstation from the information-security server, an approval for said access the workstation when if: the username and the password were entered correctly, and the security information corresponds to the user;
receiving, by the workstation from the information-security server, a denial for said access to the workstation when if: the username and the password were entered incorrectly, or the security information does not correspond to the user;
verifying, by the information-security server, that a precise position of the first authenticator corresponds to a location within the predetermined physical proximity zone of the workstation;
granting, by the information-security server, access to the workstation when: the username and the password are verified as correct, response to the dual-factor challenge is successful, the first authenticator is within the predetermined physical proximity zone, the security information corresponds to the username and the password, and the precise position aligns with the predetermined physical proximity zone;
continuously monitoring, by the workstation in real-time, a presence of the first authenticator within the predetermined physical proximity zone at periodic intervals shorter than an inactivity timeout period of the workstation, wherein the periodic intervals are less than 30 seconds;
detecting, by the workstation using a local-communication protocol, whether a second authenticator not corresponding to the user enters the predetermined physical proximity zone during an active session of the user;
generating, by the workstation, a security alert when the second authenticator is detected within the predetermined physical proximity zone;
transmitting, by the workstation to the information-security server, the security alert for logging and potential security action; and
terminating, by the workstation in real-time, the access to the workstation when: the second authenticator ceases to be within the predetermined physical proximity zone for a security interval of less than 5 seconds, and the second authenticator is detected within the predetermined physical proximity zone.

13. An information-security process for authenticating a user comprising the steps of:
receiving, by a workstation, a username and password for the user;
issuing, by an information-security server to the user, a dual-factor challenge;
receiving, by the information-security server from the user, the dual-factor challenge;
detecting, by the workstation using a local-communication protocol, whether a first authenticator is within proximate range defined as a predetermined physical proximity zone of 12 to 60 inches around the workstation;
rejecting, by the workstation, access to the workstation if the first authenticator is not within said predetermined physical proximity zone;
scanning, by the workstation from the first authenticator, security information for the user;
transmitting, by the workstation to the information-security server, the username, the password, and the security information;
receiving, by the workstation from the information-security server, an approval for said access the workstation when #: the username and the password were entered correctly, and the security information corresponds to the user;
receiving, by the workstation from the information-security server, a denial for said access to the workstation when #: the username and the password were entered incorrectly, or the security information does not correspond to the user;
geolocating, by a plurality of location-detection devices using a triangulation or time-of-flight method, a position of the user;
transmitting, by one or more of said plurality of location-detection devices to the information-security server, the position of the user;
tracking, by the information-security server, the position of the user;
verifying, by the information-security server, that a precise position of the first authenticator corresponds to a location within the predetermined physical proximity zone of the workstation;

granting, by the information-security server, access to the workstation when: the username and the password are verified as correct, response to the dual-factor challenge is successful, the first authenticator is within the predetermined physical proximity zone, the security information corresponds to the username and the password, and the precise position aligns with the predetermined physical proximity zone;

continuously monitoring, by the workstation in real-time, a presence of the first authenticator within the predetermined physical proximity zone at periodic intervals shorter than an inactivity timeout period of the workstation, wherein the periodic intervals are less than 30 seconds;

detecting, by the workstation using the local-communication protocol, whether a second authenticator not corresponding to the user enters the predetermined physical proximity zone during an active session of the user;

generating, by the workstation, a security alert when the second authenticator is detected within the predetermined physical proximity zone;

transmitting, by the workstation to the information-security server, the security alert for logging and potential security action; and terminating, by the workstation in real-time, the access to the workstation when: the second authenticator ceases to be within the predetermined physical proximity zone for a security interval of less than 5 seconds, and the second authenticator is detected within the predetermined physical proximity zone.

14. A method for enhancing information-security authentication of a user at a workstation within a secured facility, comprising:

receiving, by the workstation, a username and a password entered by the user via an input interface of the workstation, wherein the workstation is communicatively coupled to an information-security server via a network;

transmitting, by the workstation to the information-security server, the username and the password for initial verification;

issuing, by the information-security server to a secondary device associated with the user, a dual-factor authentication challenge, wherein the secondary device is distinct from the workstation and the dual-factor authentication challenge requires user confirmation via at least one of a biometric scan or a passcode entry;

receiving, by the information-security server from the secondary device, a response to the dual-factor authentication challenge;

detecting, by the workstation using a local-communication protocol selected from a near-field-communication (NFC) protocol or a radio-frequency-identification (RFID) protocol, whether a first portable authenticator carried or worn by the user is within a predetermined physical proximity zone around the workstation, the predetermined physical proximity zone defined as a radial distance of 12 to 60 inches from the workstation;

rejecting, by the workstation, access to the workstation if when the first portable authenticator is not detected within the predetermined physical proximity zone;

scanning, by the workstation from the first portable authenticator via the local-communication protocol, security information uniquely identifying the portable authenticator, wherein the security information includes a unique identifier corresponding to the user;

transmitting, by the workstation to the information-security server, the security information scanned from the first portable authenticator;

geolocating, by a plurality of location-detection devices distributed within the secured facility, a precise position of the first portable authenticator using a triangulation method or a time-of-flight method, wherein each location-detection device is configured to transmit and receive signals via at least one of Bluetooth Low Energy or Wi-Fi protocols;

transmitting, by at least one of the plurality of location-detection devices to the information-security server, the precise position of the first portable authenticator;

verifying, by the information-security server, that the precise position of the first portable authenticator corresponds to a location within the predetermined physical proximity zone of the workstation;

granting, by the information-security server, access to the workstation when:

the username and the password are verified as correct, the response to the dual-factor authentication challenge is successful, the first portable authenticator is within the predetermined physical proximity zone, the security information corresponds to the username and the password, and the precise position aligns with the predetermined physical proximity zone;

continuously monitoring, by the workstation in real-time, a presence of the first portable authenticator within the predetermined physical proximity zone at periodic intervals shorter than an inactivity timeout period of the workstation, wherein the periodic intervals are less than 30 seconds;

detecting, by the workstation using the local-communication protocol, whether a second portable authenticator not corresponding to the user enters the predetermined physical proximity zone during an active session of the user;

generating, by the workstation, a security alert if when the second portable authenticator is detected within the predetermined physical proximity zone;

transmitting, by the workstation to the information-security server, the security alert for logging and potential security action; and terminating, by the workstation in real-time, the access to the workstation when #: the portable authenticator ceases to be within the predetermined physical proximity zone for a security interval of less than 5 seconds, er and the second portable authenticator is detected within the predetermined physical proximity zone.

15. The method of claim 14, further comprising:

tracking, by the information-security server, a location of the first portable authenticator within the secured facility during an emergency event; and generating, by the information-security server, an accountability report indicating whether the user associated with the first portable authenticator has evacuated the secured facility.

16. The method of claim 14, further comprising:

detecting, by at least one of the plurality of location-detection devices, whether the first portable authenticator enters a restricted area within the secured facility, the restricted area being distinct from the predetermined physical proximity zone; and triggering, by the information-security server, a security alarm if the first portable authenticator is not authorized to enter the restricted area.

17. The method of claim 14, wherein the first portable authenticator is a wearable device selected from the group consisting of a smart watch, smart glasses, and a badge.

18. The method of claim 14, wherein detecting whether the first portable authenticator is within the predetermined physical proximity zone includes analyzing a signal intensity falloff of a signal received from the first portable authenticator to empirically determine a distance between the first portable authenticator and the workstation.

19. The method of claim 14, further comprising:
configuring, by the workstation, the predetermined physical proximity zone to have a geometric shape selected from the group consisting of a circle, a square, and a directional zone; and
adjusting, by the workstation, the geometric shape based on a topology of the secured facility.

20. The method of claim 14, further comprising:
tracking, by the information-security server, a location of the first portable authenticator within the secured facility during an emergency event;
generating, by the information-security server, an accountability report indicating whether the user associated with the first portable authenticator has evacuated the secured facility;
detecting, by at least one of the plurality of location-detection devices, whether the first portable authenticator enters a restricted area within the secured facility, the restricted area being distinct from the predetermined physical proximity zone;
triggering, by the information-security server, a security alarm if the first portable authenticator is not authorized to enter the restricted area;
configuring the first portable authenticator as a wearable device selected from the group consisting of a smart watch, smart glasses, and a badge;
analyzing a signal intensity falloff of a signal received from the first portable authenticator to empirically determine a distance between the first portable authenticator and the workstation during detection of whether the portable authenticator is within the predetermined physical proximity zone;
configuring, by the workstation, the predetermined physical proximity zone to have a geometric shape selected from the group consisting of a circle, a square, and a directional zone; and
adjusting, by the workstation, the geometric shape based on a topology of the secured facility.

* * * * *